US011115623B2

(12) United States Patent
Balcioglu et al.

(10) Patent No.: US 11,115,623 B2
(45) Date of Patent: Sep. 7, 2021

(54) SYSTEMS AND METHODS FOR ASYMMETRIC IMAGE SPLITTER WITH LINE MARK MEMORY

(71) Applicant: Maxim Integrated Products, Inc., San Jose, CA (US)

(72) Inventors: Yalcin Balcioglu, Istanbul (TR); Arda Kamil Bafra, Istanbul (TR); Levent Yakay, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 16/381,408

(22) Filed: Apr. 11, 2019

(65) Prior Publication Data

US 2019/0342518 A1  Nov. 7, 2019

Related U.S. Application Data

(60) Provisional application No. 62/668,087, filed on May 7, 2018.

(51) Int. Cl.
*H04N 7/01* (2006.01)
*H04N 7/10* (2006.01)

(52) U.S. Cl.
CPC .......... *H04N 7/104* (2013.01); *H04N 7/0122* (2013.01)

(58) Field of Classification Search
None
See application file for complete search history.

(56) References Cited

U.S. PATENT DOCUMENTS

| 4,566,038 A | * | 1/1986 | Dimick | G09G 5/42 |
| | | | | 382/239 |
| 5,909,251 A | * | 6/1999 | Guichard | G06K 9/342 |
| | | | | 348/416.1 |
| 6,687,779 B1 | * | 2/2004 | Sturm | G06F 13/4045 |
| | | | | 710/305 |
| 7,319,720 B2 | * | 1/2008 | Abrams, Jr. | H04N 19/597 |
| | | | | 375/240.12 |

(Continued)

OTHER PUBLICATIONS

Search report IP.com.*

(Continued)

*Primary Examiner* — Mohammad J Rahman
(74) *Attorney, Agent, or Firm* — North Weber & Baugh LLP; Michael North (57) ABSTRACT

Described herein are systems and methods that provide for implement an asymmetric image splitter engine that may reduce the memory requirements. In one or more embodiments, a method may comprise receiving a multi-streaming video comprising super-frame video images, where each super-frame video images includes a first video image and a second video image, and where the height of the first video image is higher than the second video image. The vertical asymmetry of the second video image may be adjusted to same height as the first video image by adding padding to the second video image. An asymmetric image splitter engine may be utilized to split the super-frame video images into two separate video images. By marking each line of the second video image, it may be determined which lines are padded and discarded, and which lines are data to be displayed using a line mark memory.

20 Claims, 7 Drawing Sheets

(56) References Cited

U.S. PATENT DOCUMENTS

| | | | | |
|---|---|---|---|---|
| 7,606,484 | B1* | 10/2009 | Richards | G01J 5/602 |
| | | | | 396/322 |
| 7,634,157 | B1* | 12/2009 | Richards | G01J 3/02 |
| | | | | 382/284 |
| 8,369,399 | B2 | 2/2013 | Egnal et al. | |
| 8,395,605 | B2 | 3/2013 | Sisto et al. | |
| 10,032,432 | B2* | 7/2018 | Qi | H04N 7/18 |
| 2005/0024353 | A1* | 2/2005 | Amundson | G02F 1/167 |
| | | | | 345/204 |
| 2006/0179201 | A1* | 8/2006 | Riedel | G09G 5/006 |
| | | | | 710/305 |
| 2009/0278763 | A1* | 11/2009 | Zeng | G06F 3/1431 |
| | | | | 345/1.1 |
| 2009/0313669 | A1* | 12/2009 | Boudani | H04N 21/64707 |
| | | | | 725/109 |
| 2012/0044353 | A1* | 2/2012 | Chiang | G08G 1/015 |
| | | | | 348/149 |
| 2014/0218535 | A1* | 8/2014 | Ihlenburg | B60R 16/02 |
| | | | | 348/148 |
| 2015/0026373 | A1* | 1/2015 | Chu | G06F 1/08 |
| | | | | 710/105 |
| 2015/0049256 | A1* | 2/2015 | Goodart | G06F 13/40 |
| | | | | 348/836 |
| 2015/0210274 | A1* | 7/2015 | Clarke | B62D 6/00 |
| | | | | 382/104 |
| 2015/0254853 | A1* | 9/2015 | Tanaka | B60R 1/00 |
| | | | | 348/148 |
| 2017/0103727 | A1* | 4/2017 | Qi | G09G 5/006 |
| 2018/0253823 | A1* | 9/2018 | Furuki | B60R 1/00 |
| 2018/0260184 | A1* | 9/2018 | Hardacker | G09G 5/005 |
| 2018/0270506 | A1* | 9/2018 | Ruiz Coll | H04N 19/61 |
| 2018/0316524 | A1* | 11/2018 | Cohen | H04L 25/03949 |
| 2019/0250610 | A1* | 8/2019 | Luo | G05D 1/0278 |
| 2019/0313053 | A1* | 10/2019 | Chane | G09G 5/006 |

OTHER PUBLICATIONS

Texas Instruments Incorporated, "Stepping into next-generation architectures for multi-camera operations in automobiles," Jun. 2017, SPRY308, 13pgs.

* cited by examiner

Reconstructed images in the receiver to drive the displays

FIG. 5

FIG. 6 ical, or function described in connection with the embodi-
SYSTEMS AND METHODS FOR ASYMMETRIC IMAGE SPLITTER WITH LINE MARK MEMORY

CROSS-REFERENCE TO RELATED APPLICATIONS

This patent application is related to and claims priority benefit under 35 U.S.C. § 119(e) to commonly-owned U.S. Provisional Patent Application No. 62/668,087, entitled "SYSTEMS AND METHODS FOR ASYMMETRIC DUAL-VIEW SPLITTER WITH LOOK-UP TABLE," naming as inventors Yalcin Balcioglu, Arda Kamil Bafra, and Levent Yakay, and filed May 7, 2018, which patent document is incorporated by reference herein in its entirety and for all purposes.

A. TECHNICAL FIELD

The present disclosure relates generally to systems and methods for serializing/deserializer (SerDes) communications. More particularly, the present disclosure relates to systems and methods for asymmetric image splitter applications.

B. BACKGROUND

Gigabit Multimedia Serial Link (GMSL) serializer and deserializers (SerDes) may support the high bandwidth, complex interconnect, and data integrity requirements required for a variety of applications. For example, but without limitations, the applications may include low-power requirements for cameras and widely varying bandwidth of sensor data aggregations. Using shielded twisted pair (STP) or coax cables of up to 15 meters, GMSL serializers and deserializers may meet stringent electromagnetic compatibility (EMC) requirements of the automotive and other industries. In some embodiments, the applications may include future automotive infotainment and advanced driver assistance systems (ADAS).

Spread-spectrum capability may be built into each serializer and deserializer IC to improve the electromagnetic interference (EMI) performance of the link, without the need for an external spread-spectrum clock. Interoperation of serializers and deserializers within the family allows the use of different interfaces at each end of the link. In addition to driving high-resolution central/rear-seat displays and instrument clusters, GMSL SerDes systems can also be used in megapixel camera systems.

In some embodiments, asymmetric image splitters (e.g., an asymmetric side-by-side dual-view splitter engine) operate using an algorithm to split and extract the individual video images from multiple images (e.g., a dual-view image). These embodiments may create a requirement where the transmitter and the receiver must be designed in agreement and in advance by multiple vendors, thus increasing the complexity and memory requirements.

Accordingly, what is needed are systems and methods that may implement an asymmetric image splitter that may be flexible and can allow vendors to independently design their products while reducing the memory requirements.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characterment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Furthermore, it shall be noted that: (1) certain steps may optionally be performed; (2) steps may not be limited to the specific order set forth herein; (3) certain steps may be performed in different orders; and (4) certain steps may be done concurrently.

Figure 1A:
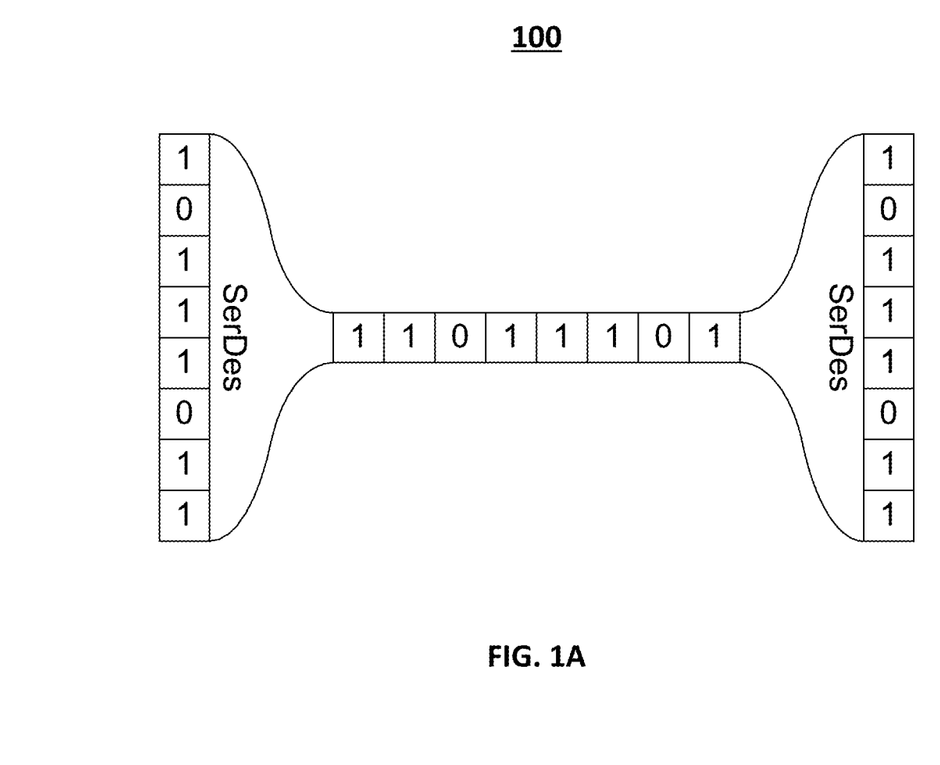
FIG. 1A illustrates the functionality of a serializer/deserializer (SerDes) according to various embodiments of the present disclosure.

FIG. 1A illustrates the functionality of a serializer/deserializer (SerDes) 100 according to various embodiments of the present disclosure. A serializer/deserializer (SerDes) 100 may utilize a multigigabit, point-to-point connection technology. Effectively, SerDes 100 is a pair of functional blocks that may be used in high speed communications to compensate for limited inputs and outputs. These blocks may convert data between serial data and parallel interfaces in each direction. In some embodiments, SerDes 100 may provide data transmission over a single/differential line in order to minimize the number of I/O pins and interconnects. Parallel clock SerDes may be used to serialize a parallel bus input along with data address and control signals. The serialized stream may be sent along with a reference clock. In some embodiments, the clock may be provided via a phase lock loop (PLL) oscillator.

In some embodiments, the multigigabit, point-to-point connection technology is Gigabit Multimedia Serial Link (GMSL) SerDes technology. GMSL technology may simultaneously transports HD video, audio, control information, aggregated sensor data, and Gigabit Ethernet over 15 meters of a single coaxial cable or 10 meters to 15 meters of shielded-twisted pair cabling, all while meeting automotive electromagnetic compatibility (EMC) specifications. The use of coaxial and shielded-twisted pair cables can mitigate what would otherwise be a complex interconnect backbone, supporting video multi-streaming at lower system cost. Compared to Ethernet technology, GMSL technology can transport multi-megapixel images without compression. As such, GMSL can support the machine vision technology that is becoming essential for safety features such as object and pedestrian detection. Other embodiments with data compression results in artifacts and lost information that may limit the ability to support machine vision.

Each GMSL SerDes IC may feature a built-in spread-spectrum capability, which reduces electromagnetic interference (EMI) of the link. The power-over-coaxial architecture of the ICs may eliminate the need for additional power or ground wires, addressing vehicle weight challenges. With an integrated bidirectional control channel, a single microcontroller can program the serializer, deserializer, and all the connected peripherals. In one or more embodiments, this architecture eliminates a remote-side microcontroller and its support components, simplifying the design and reducing cost, size, and power consumption. Also lowering system costs as well as reducing design time is the ability to daisy-chain multiple camera modules over GMSL. Data integrity is enhanced from the technology's built-in diagnostic capabilities.

Figure 1B:
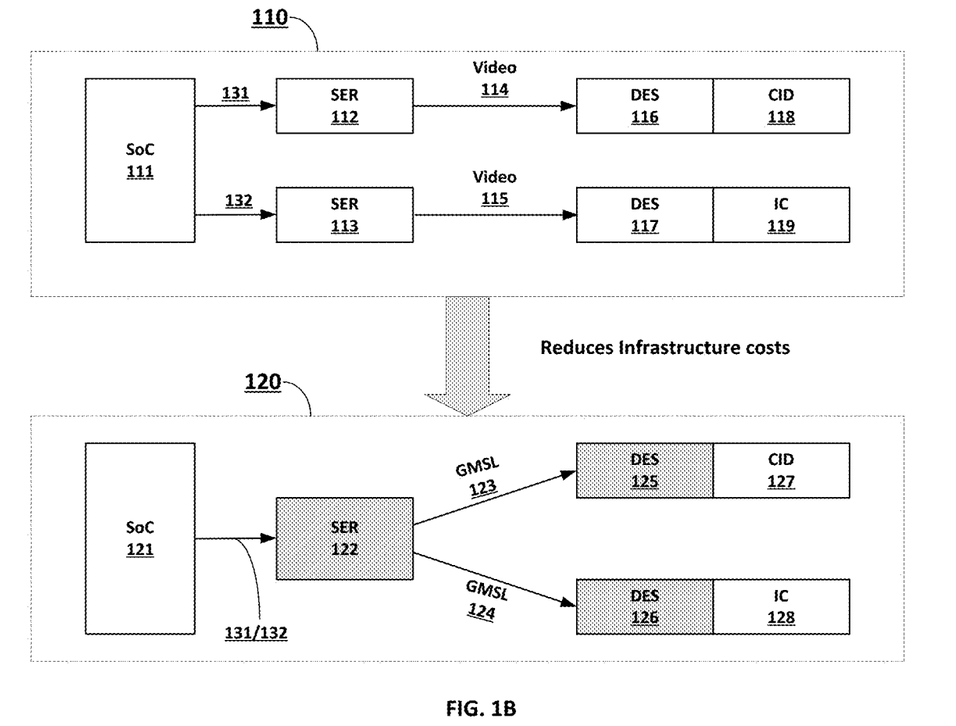
FIG. 1B depicts two configurations for video multi-streaming according to various embodiments of the present disclosure.

FIG. 1B depicts two configurations for video multi-streaming according to various embodiments of the present disclosure. As shown in FIG. 1B, GMSL technology allows video aggregation and video splitting. Video system 110 comprises SoC 111, serializers (SER 112, SER 113), deserializers (DES 116, DES 117), CID 118 and an IC 119. (CID=central instrument display; IC=instrument cluster) As illustrated, SER 112 and SER 113 separately receive a video signal 131 and video signal 132, respectively, from SoC 111. SER 112 and SER 113 process their respective videos signals, and generate video 114 and video 115, respectively. Video 114 and video 115 are respectively coupled to DES 116 and DES 117, and generate CID 118 and an IC 119, respectively. For video system 110, the video signals from SoC 111 are processed in parallel, requiring separate serializers and additional I/O interfaces.

Asymmetric Image Splitter

In some other embodiments, video system 120 utilizes GMSL technology that allows video aggregation and video splitting. As illustrated, video system 120 comprises SoC 121, serializer, SER 122, deserializers, DES 125 and DES 126, CID 127 and an IC 128. Per FIG. 1B, SER 122 receives a multi-video signal 131/132 from SoC 121. Multi-video signal 131/132 comprises the content of video signal 131 and video signal 132. In other words, the multi-video signal 131/132 comprises two video signals and may be referred to as a super-frame image stream. SER 122, comprising an asymmetric image splitter, and generates GMSL 123 and GSML 124. GMSL 123 and GSML 124 are coupled to DES 125 and DES 126, and generate CID 127 and an IC 128, respectively. An example of the asymmetric image splitter at the input of SER 122 may include but is not limited to an asymmetric side-by-side dual-view splitter. In some embodiments, multiple images in the input super-frame may be in side-by-side formation. As illustrated, with GMSL technology, infrastructure costs may be reduced.

Many of asymmetric image splitter operate using PLLs to generate the video clocks for individual displays. Utilization of PLLs to generate video clocks for individual displays may elevate the power and area consumption considerably.

The number of displays in vehicles is continuously increasing. Traditionally a system designer would need to associate an individual SOC video output port to each display. As the number of displays increase, this may mean that more SOCs are needed or the SOCs with more video output ports must be selected thereby increasing cost. If a SOC video port can be used to drive multiple displays with a single virtual channel, cheaper SOCs with less output ports can be used in the system and cost can be reduced.

Many of asymmetric image splitters operate using an algorithm to extract the individual video images from a multi-image input. This procedure may create a requirement where the transmitter and the receiver must be designed in agreement and in advance by multiple vendors.

FIG. 2A, FIG. 2B, FIG. 3, and FIG. 4 and FIG. 4B collectively illustrate that an asymmetric image splitter with a line mark memory allows multiple displays with different resolutions to be efficiently driven from the same SOC video output port. This method and apparatus may be implemented for example, but without limitation, video system 120. In one or more embodiments, super-frame image streams may comprise image streams or image data from video, LIDAR (Light Detection and Ranging), radar, or other sensors. The super-frame image streams may comprise image streams supporting Advanced Driver-Assistance Systems (ADAS) or automotive infotainment applications. In one or more embodiment, a line mark memory is a look-up table.

Figure 2A:
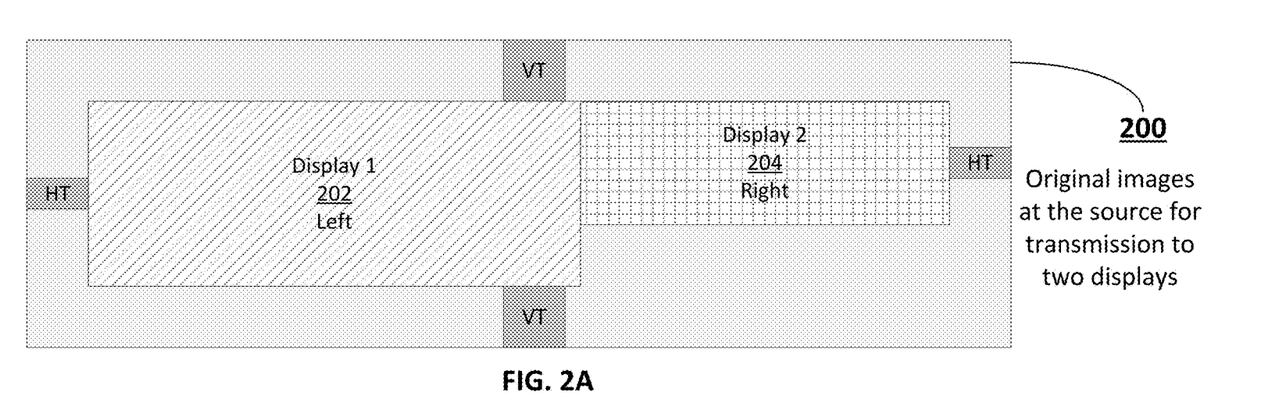
FIG. 2A depicts a super-frame of video images for multi-streaming video according to various embodiments of the present disclosure.

FIG. 2A depicts a Super-Frame 200 of video images for multi-streaming video according to various embodiments of the present disclosure. The two video images may be combined side by side and top aligned to form Super-Frame 200 of video images. Super-frame 200 of video images comprises the combination of two video images, Display1 202, and Display2 204 that represent original images at the source, i.e., SoC 121. These original images may be subsequently transmitted to their corresponding displays. As illustrated, Display1 202 has a higher height than Display2 204. Accordingly, the resolution of the video image for Display1 202 has a higher than the resolution of Display2 204. In some embodiments, Display1 202 may be positioned on the left side of Display2 204 in Super-Frame 200. Accordingly, Display2 204 may be positioned on the right side of Display1 202 in Super-Frame 200. In FIG. 2A, VT represents the amount of vertical blanking and HT represents the amount of horizontal blanking.

Figure 2B:
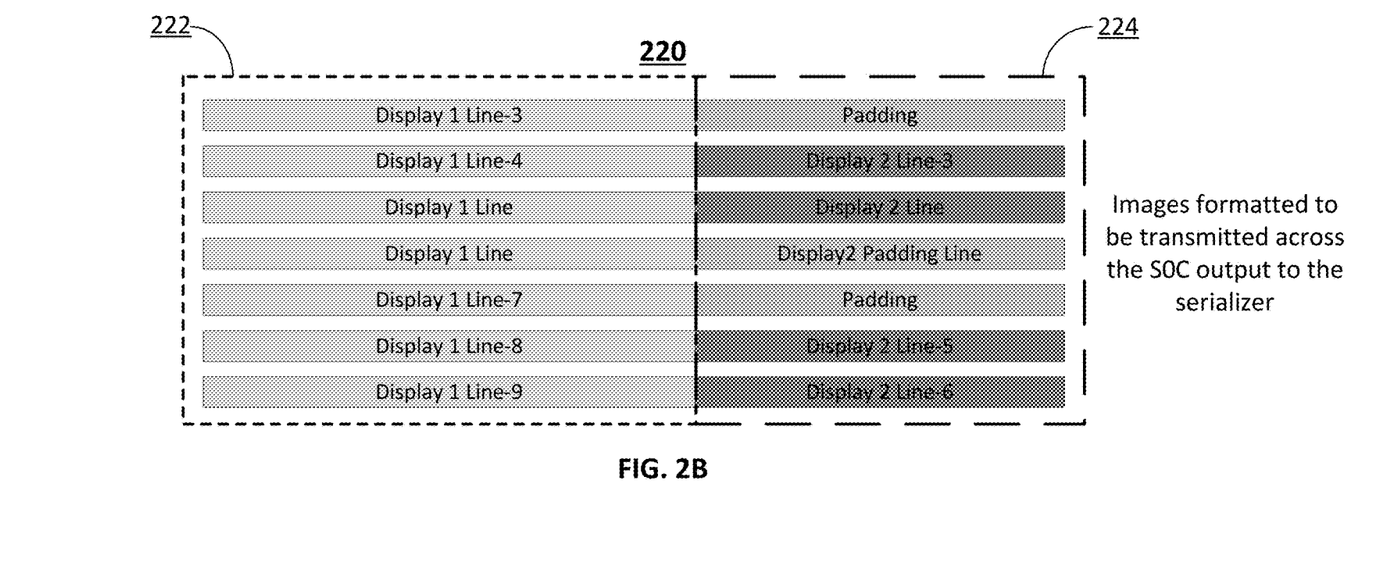
FIG. 2B depicts vertical distribution image formatting of vertical images according to various embodiments of the present disclosure.
Figure 3:
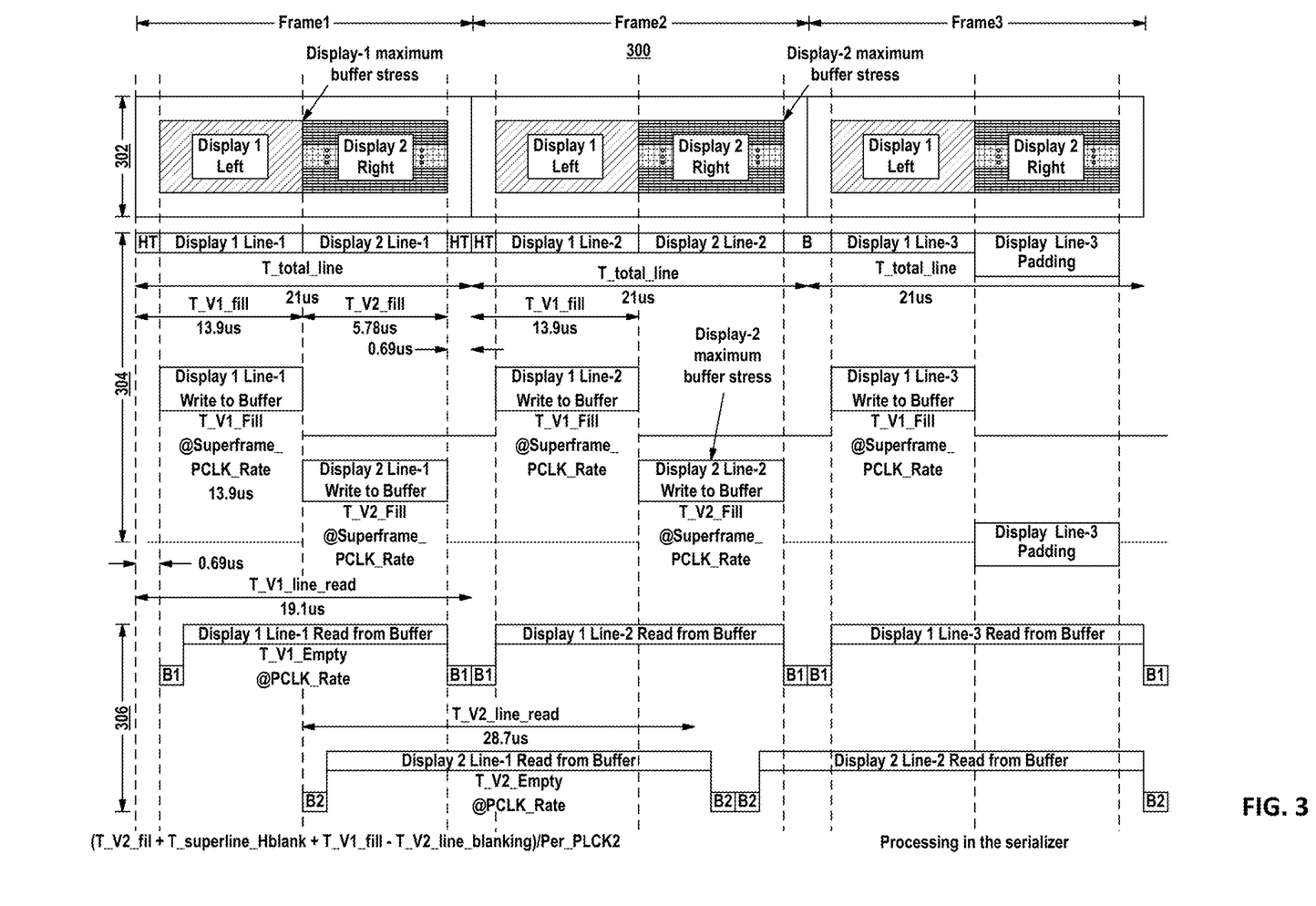
FIG. 3 depicts timing for an asymmetric image splitter for multi-streaming video image applications according to various embodiments of the present disclosure.

FIG. 2B depicts vertical distribution image formatting of Video Image 220 according to various embodiments of the present disclosure. The images are formatted and transmitted across the SOC output to a serializer. In one embodiment, the serializer is SER 122. The video image of Display1 202 is vertically distributed, line by line, to form Video Image 222. The video image of Display2 204 is vertically distributed, line by line, to form Video Image 224. In order for Video Image 224 to have the same height as Video Image 222, padding may be added to Video Image 224 by the SOC. Video image 220 represents the output of the SOC, for example, but not limited, SoC 121. And the output of the SOC is couple to the input of the serializer FIG. 3 depicts timing 300 for an asymmetric image splitter for multi-streaming video image applications according to various embodiments of the present disclosure. FIG. 3 illustrates the video processing in SER 122. Timing 300 illustrates three frames of operation, frame1, frame2 and frame3.

Timing 302 illustrates the serial frame transmission of Display1 and Display 2. In the frame1, Display1 has the maximum buffer stress after the transmission of the video image of Display1. In the frame1, Display2 has the maximum buffer stress after the transmission of the video image of Display2. This is important as it allows the system designer to understand the worst-case memory requirement for the selected particular resolutions and check if the Serializer memory is enough for the selected particular resolutions.

Timing 304 represents the output of SoC 121, which is the input to SER 122. The video images for Display 1 and Display 2 are transmitted in frames 1, 2, and 3 in a serial manner. Timing 304 also illustrates Display 1, lines 1, 2 and 3 are written to buffer in frame 1, 2 and 3, respectively. Display 2 line 1 and 2 are written to buffer in frames 1 and 2, respectively, and Display 2 line 3 is not written to buffer since Display 2 line 3 is padding. From this sequence, the data in first three lines of Display 1 and Display 2 are processed and stored in the buffer of SER 122. Per time 304, the padding includes Display 1 line 3 Padding and Display 1 line 3. This padding may be discarded based on instruction of a line mark memory.

Timing 306 represents the data being read from the buffer of SER 122. Display 1, lines 1, 2 and 3 are read from the buffer, and Display 1, lines 1, 2 are read from the buffer. This process occurs during the time span of frame1, frame2 and frame3. Timing 306 illustrates a delay in reading from the buffer relative to writing to the buffer. Timing 306 also illustrates that the video image of Display 1 and the video image of Display 2 are separated (split) and can be separately input to DES 125 and DES 126.

Line buffers in SER 122 receive the Video Image 222 and Video Image 224. Since Video Image 222 does not include any padding, all lines of Video Image 222 may be written to buffer. Then the line buffers read the Display 1 data and a video clock associated with Video Image 222 is generated to drive the input of Display 2 402.

Figure 4A:
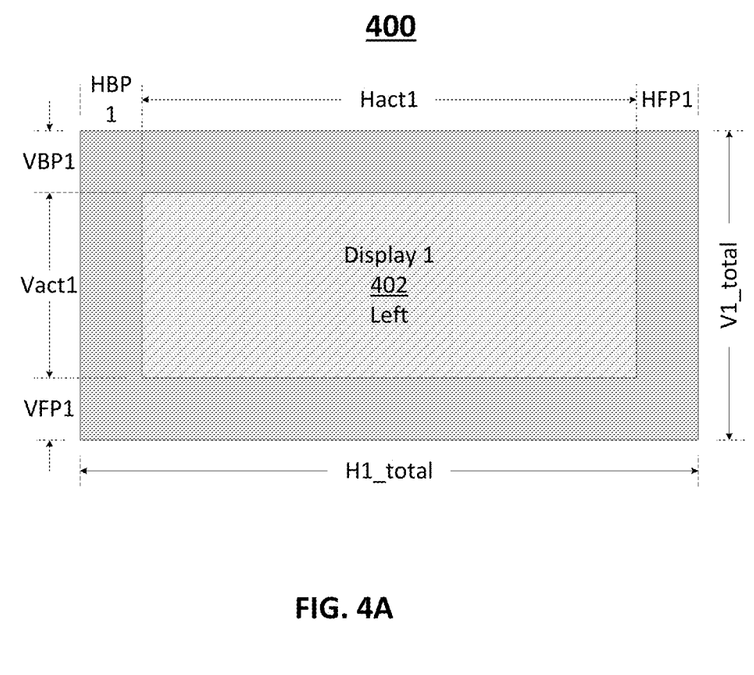
FIG. 4A and FIG. 4B depicts the reconstructed video images after asymmetric image splitting according to various embodiments of the present disclosure.
Figure 4B:
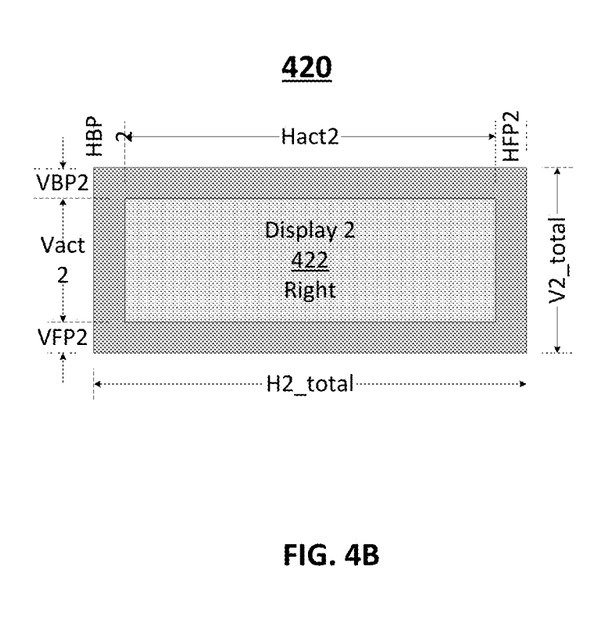

Since Video Image 224 includes padding, SER 122 discards the padding while filling the buffers with the Display 2 data of Video Image 224. Then, the content of the buffers is read, and a generated video clock associated with Video Image 224 drive the input of Display 2 422. As discussed herein, the procedure to disregard padding may be facilitated via a line mark memory.

Terms included in FIG. 3 include:
HS=horizontal sync
VS=vertical sync
Tvbp=vertical backporch time
Tvfp=vertical frontporch time
Tvact=vertical active time
Thbp=horizantal backporch time
Thfp=horizantal frontporch time
Thact=horizantal active time
HSA=horizontal sync active time
BL=blanking line
B1, B2=blanking line times of display 1 and display 2
T_V*_Fill=time to write to the buffer
T_V*_Read=time to read from the buffer FIG. 4A and FIG. 4B depict the reconstructed Video Image 400 and Video Image 420, respectively, after asymmetric image splitting according to various embodiments of the present disclosure. These reconstructed images are input to DES 125 and DES 126, respectively. Reconstructed Video Image 400 comprises the Video Image of Display 1 402, and reconstructed Video Image 420 comprises the video image of Display 2 422. Video image 400 also corresponds to Display 1 202, and Video Image 420 corresponds to Display2 204. The border around each video image represents a display blanking area.

The memory requirement in the asymmetric image splitter may be defined by the difference between the input and output time difference of every individual pixel. It is imperative that the pixel is read out of the video reception buffers as early as possible after it is received from the SOC. As the display mandates the memory read timing, the only freedom on the system exists while writing to the video reception buffers in the serializer. To make sure that the memory requirement is low, the previous points may suggest that the pixel should be written to the memory in such a way that it arrives as late as possible but before it is read. This can be achieved by making sure that the data is not sent as a burst from the SOC to the serializer, but it is spread out by skipping lines in time to reduce its burstiness. Comparing timing 304 and timing 306, for Display 1 line-1, the delay between Write to Buffer and Read from Buffer is B1. And comparing timing 304 and timing 306, for Display 2 line-1, the delay between Write to Buffer and Read from Buffer is B2.

The amount and placement of padding may determine the timing of writing and reading pixels in a serializer. Padding may occur in many ways and determine, in part, the amount of memory required in a serializer. For example, if all the data in the video image is first transmitted and then all the padding is transmitted, this method can require the largest amount of memory. If the data arrives early, the required amount of memory increases. If a repetitive pattern is used, e.g. Table 1 as described herein, data of the vertical image is vertically distributed in time, so the data is delayed, and does not arrive too early. When padding is added, the data in the video image may be delayed, but in a smart way, that is, the data is received a bit earlier than it would be shown on a display. This method can reduce the memory requirement.

As the vertical asymmetry of the shorter display creates more memory requirement in the splitter device, the shorter image, for example Display 2 204, is vertically distributed to match the height of the video (cross hatch pattern) stream using blank video lines. The stuffed blank line with padding in a super-frame is transmitted out of the video port of SoC 121 with a video clock frequency faster than the video clocks of both individual Display1 402, and Display2 422.

When the SER 122 receives the super-frame, it splits this image into two displays with unique display timing parameters together with associated display video clock frequencies different than the super-frame. For example, but without limitation, the video clock of SoC 121 may be 200 MHz, and the video clock of Display1 402 may be 148 MHz, and the video clock of Display2 422 may be 67 Mhz. After split, the individual video streams can be transferred to a remote location either using the same serial link or separate serial links.

Generation of Individual Display Images Using Line Mark Memory

Figure 5:
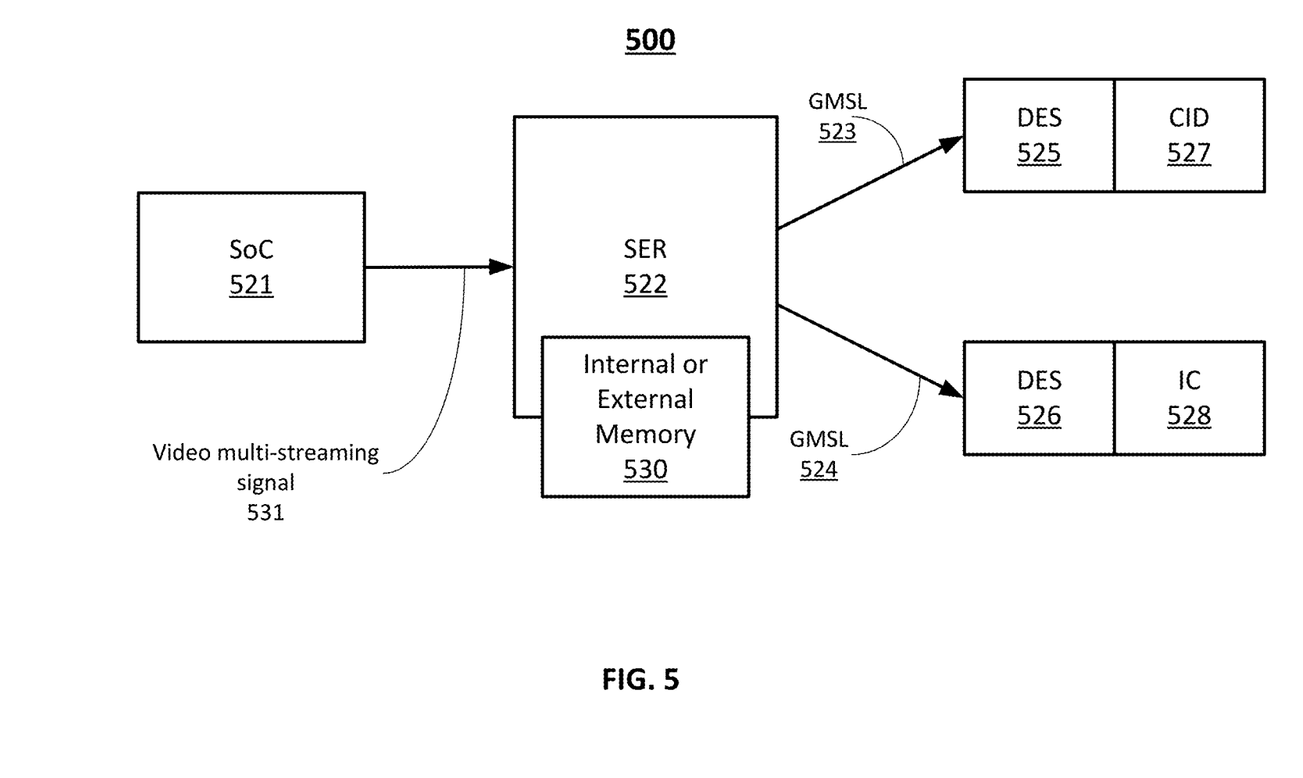
FIG. 5 depicts a configuration for video multi-streaming with an internal or external memory integrated in a serializer according to embodiments of the present invention.

FIG. 5 depicts a configuration for video multi-streaming 500 with an internal or external memory of a serializer according to embodiments of the present invention. As illustrated, SoC 521 outputs a video multi-streaming signal 531 to SER 522. SER 522 comprises a line mark memory 530, which may be program to provide instruction for discarding padding of individual video images. The output of SER 522 may be GMSL 523 and GMSL 524, which are inputs to DES 525 and DES 526, respectively. DES 525 and DES 526 are respectively coupled to CID 527 and IC 528.

The horizontal video lines incoming from SOC to the serializer arrive to the asymmetric image splitter block. The coordinates of Video Image 222 and Video Image 224 on super-frame 200 are programmed in to the firmware. This allows distinguishing between Video Image 222 and Video Image 224 of the incoming data. The Video Image 222 may be directly written in the memory of Display1 and it is read out from this memory to directly drive the Display1 402. Timing 304 illustrates this process.

As Video Image 224 has vertically distributed and not continuous lines, some of the video lines in the image are blank and should not be written to the memory of Display 2. This result is obtained by having a programmable line mark memory which may be used to isolate the blank lines from the real video lines. After the serializer reads a line, the line mark memory may determine whether the line comprises valid video data; otherwise, the serializer removes blank lines, i.e., padding. The line mark memory may consume more die area compared to algorithmic alternatives, however the data store/memory is flexible, and it allows the user to employ any mechanism that is desired, thereby allowing an inherent compatibility to a variety of SOC outputs. The Video Image 224 is read out from the memory to drive the Display2.

To, reduce the required memory and the associated die cost for asymmetric image split, it may be crucial to place the Video Image 224 in the vertical line distribution such that they are written to the memory right before they are read. User can use the line mark memory in any way desired to mark the active display 2 lines (square pattern of 224) in the vertical line stream and comply to various SOC outputs available while keeping the memory cost minimal.

While the line mark memory has 2160 register bits to mark individually, the active video lines for Display 2 without any pattern restriction, it is also possible to provide some preprogrammed line mark memory templates to the user such as the ones explained in Table 1:

TABLE 1

| Ratio | Description |
|-------|-------------|
| 1:1 | Don't skip any lines |
| 2:1 | Skip every other line |
| 3:1 | Skip two lines in every three lines |
| 4:1 | Skip three lines in every four lines |
| 3:2 | Skip one line in every three lines |
| 4:3 | Skip one line in every four lines |
| 5:2 | Skip three lines in every five lines |
| 5:3 | Skip two lines in every five lines |
| 8:5 | Skip three lines in every eight lines |

Per Table 1, if 2:1 is selected, lines may be selected with the pattern 1010101010110 . . . to the end of the memory. If 3:2 is selected, line may be selected with the pattern, 110110110 to the end of the memory, etc. As noted, the designer can program custom pattern to mark which lines are padded or not.

A designer may program the SOC and serializer. A line mark memory may be programmed by a user and used by a serializer, such as SER 122. The serializer may comprise registers that control the operation of the line mark memory. Also, the serializer may be programmed using I²C (Inter-Integrated Circuit). I²C is a synchronous, multi-master, multi-slave, packet switched, single-ended, serial computer bus. With a line mark memory, each line of a video image, i.e., display data) can be marked as padding, to be discarded, or display data to be displayed. The line mark memory may be based on the ratio of heights of the video images of a super-frame, or a repetitive pattern, as described in Table 1, or may be customized by a user. A line mark memory is flexible and not constrained by a specific algorithm.

In some embodiments for a multi-streaming video, the super-frames therein may have a constant amount of padding in each of their video frames. In other embodiments for multi-streaming video, the super-frames may a different amount of padding. The amount of padding required may change based on a resolution difference between the video images in the super-frame. The resolution difference may be expressed by a ratio of the heights of the two video images in the super-frame.

In summary, in one or more embodiments, system supporting video multi-streaming may comprise: 1) a system on a chip that generates a super-frame of video images comprising a first video image and a second video image, wherein the second video image is shorter than the first video image, and vertically adjusts the second video image to same height as the first video image by adding padding to select display lines; 2) a serializer comprising an asymmetric image splitter that splits the super-frame of video images into the first video image and the second video image; and 3) a line mark memory that marks each line of the second video image to determine which lines are padded and discarded, and which lines are data to be displayed. A user may determine if the line mark memory is based on a ratio of heights of the first video image and the second video image.

In one or more embodiments, method supporting video multi-streaming may comprise: 1) receiving a multi-streaming video comprising super-frame video images, wherein each super-frame video images includes a first video image and a second video image, and wherein height of the first video image is higher than the second video image; 2) adjusting vertical asymmetry of the second video image to same height as the first video image by adding padding to the second video image; 3) utilizing an asymmetric image splitter engine to split the super-frame video images into two separate video images; 4) marking each line of the second video image to determine which lines are padded and discarded, and which lines are data to be displayed using a line mark memory. A user may determine if the line mark memory is based on a ratio of heights of the first video image and the second video image. The line mark memory may be a repetitive pattern.

In one or more embodiments, system supporting image multi-streaming comprising a system on a chip (SoC) that 1) generates a super-frame of image streams including a plurality of image streams, wherein a first image stream in the plurality of image streams includes a first height that is different than a second height of at least one other image in the plurality of image streams, and that 2) adjusts the first height to the second height by adding padding to one or more select display lines in the first image stream. The system supporting image multi-streaming further comprises a serializer in communication with the system on a chip and including an asymmetric image splitter engine configured to split the super-frame of image streams into a plurality of separate image streams, the plurality of separate image streams including the first image stream; and a data store in communication with the serializer and configured to mark each line of the first image stream to determine which lines include padding to be discarded, and which lines include display data to be displayed.

In one or more embodiments, system supporting video streaming comprising a system on a chip that generates a frame of image streams comprising a single video image and vertically adjusts an original video image into a user-configured video image height and vertical blanking parameters by adding padding to select display lines; a serializer comprising an asymmetric image splitter engine that retimes received video images into the original video image; and a line mark memory that marks each line of the received video image to determine which lines are padded and discarded, and which lines are data to be displayed.

System Embodiments

In embodiments, aspects of the present patent document may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be elements of a communication system, such as GMSL serializers and deserializers that can simultaneously transport streaming image data. The computing system may include random access memory (RAM), one or more processing resources such as a central processing unit (CPU) or hardware or software control logic, ROM, and/or other types of memory. Additional components of the computing system may include one or more network or wireless ports for communicating with external devices as well as various input and output (I/O) devices, such as a keyboard, a mouse, touchscreen and/or a video display. The computing system may also include one or more buses operable to transmit communications between the various hardware components.

Figure 6:
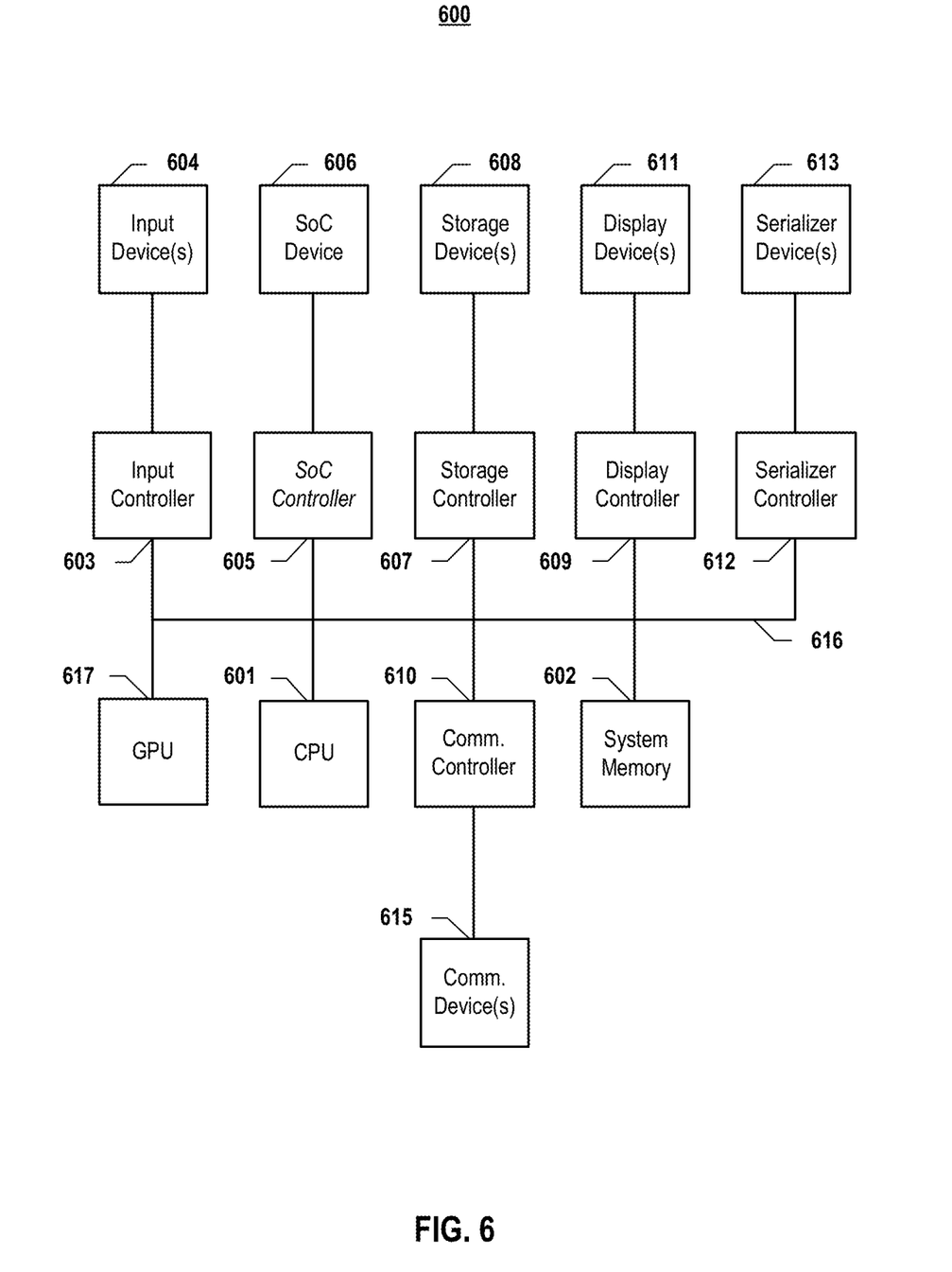
FIG. 6 depicts a simplified block diagram of a computing device/information handling system according to embodiments of the present document.

FIG. 6 depicts a simplified block diagram of a computing device/information handling system (or computing system) according to embodiments of the present disclosure. It will be understood that the functionalities shown for system 600 may operate to support various embodiments of an information handling system—although it shall be understood that an information handling system may be differently configured and include different components.

As illustrated in FIG. 6, system 600 includes one or more central processing units (CPU) 601 that provides computing resources and controls the computer. CPU 601 may be implemented with a microprocessor or the like and may also include one or more graphics processing units (GPU) 617 and/or a floating-point coprocessor for mathematical computations. System 600 may also include a system memory 602, which may be in the form of random-access memory (RAM), read-only memory (ROM), or both.

A number of controllers and peripheral devices may also be provided, as shown in FIG. 6. An input controller 603 represents an interface to various input device(s) 604, such as a keyboard, mouse, or stylus. There may also be a SoC controller 605, which communicates with a SoC device 606. System 600 may also include a storage controller 607 for interfacing with one or more storage devices 608 each of which includes a storage medium such as flash memory, or an optical medium that might be used to record programs of instructions for operating systems, utilities, and applications, which may include embodiments of programs that implement various aspects of the present invention. Storage device(s) 608 may also be used to store processed data or data to be processed in accordance with the invention. System 600 may also include a display controller 609 for providing an interface to a display device 611. The computing system 600 may also include a serializer controller 612 for communicating with a serializer device 613. A communications controller 610 may interface with one or more communication devices 615, which enables system 600 to connect to remote devices through any of a variety of networks including an automotive network, the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method comprising:
receiving a multi-streaming video comprising super-frame video images, wherein each super-frame video images includes a first video image and a second video image, and wherein height of the first video image is higher than the second video image;
adjusting vertical asymmetry of the second video image to same height as the first video image by adding padding to the second video image;
utilizing an asymmetric image splitter configured to split the super-frame video images into two separate video images; and
marking each line of the second video image to determine which lines are padded and discarded, and which lines are data to be displayed using a line mark memory,
wherein a memory requirement for the asymmetric image splitter is represented by a difference between an input time and an output time of every individual pixel of the received multi-streaming video, wherein the memory requirement is reduced when the received multi-streaming video is generated via spreading the data by skipping lines in time.

2. The method of claim 1, further comprising determining the line mark memory based on a ratio of heights of the first video image and the second video image.

3. The method of claim 1, wherein the line mark memory is a repetitive pattern.

4. The method of claim 1, wherein the line mark memory is customized by a user.

5. The method of claim 1, further comprising storing a vertical line distribution of the second video image in a data store before adjusting the vertical asymmetry of the second video image.

6. A system supporting image multi-streaming comprising:
a system on a chip (SoC) that:
generates a super-frame of image streams including a plurality of image streams, wherein a first image stream in the plurality of image streams includes a first height that is different than a second height of at least one other image in the plurality of image streams, and
adjusts the first height to the second height by adding padding to one or more select display lines in the first image stream;
a serializer in communication with the system on a chip and including an asymmetric image splitter configured to split the super-frame of image streams into a plurality of separate image streams, the plurality of separate image streams including the first image stream; and
a data store in communication with the serializer and configured to mark each line of the first image stream to determine which lines include padding to be discarded, and which lines include display data to be displayed,
wherein the SoC is configured to transmit data to the serializer via spreading the data by skipping lines in time.

7. The system of claim 6, further comprising a plurality of deserializers that are each coupled to one of the plurality of separate image streams generated by the serializer.

8. The system of claim 7, wherein the deserializers and the serializer are implemented with Gigabit Multimedia Serial Link (GMSL) technology.

9. The system of claim 6, wherein the data store comprises a look-up table.

10. The system of claim 9, wherein a user determines the look-up table based on a ratio of heights of the first image stream and the at least one other image in the plurality of image streams.

11. The system of claim 9, wherein the look-up table is a repetitive pattern.

12. The system of claim 6, wherein a ratio of heights of the first image stream and the at least one other image in the plurality of image streams determines an amount of padding to be added to the one or more select display lines in the first image stream.

13. The system of claim 6, wherein the SoC programs into firmware coordinates of the first image stream and the at least one other image in the plurality of image streams.

14. The system of claim 6, wherein the super-frame of image streams comprises image streams from video, Light Detection and Ranging (LIDAR) devices, radar, or other sensors.

15. The system of claim 6, wherein the serializer retimes received image stream into an original image stream.

16. A system supporting video streaming comprising:
a system on a chip (SoC) that generates a frame of image streams comprising a single video image and vertically adjusts an original video image into a user-configured video image height and vertical blanking parameters by adding padding to select display lines;
a serializer comprising an asymmetric image splitter that retimes received video images from the SOC into the original video image; and
a line mark memory that marks each line of the received video image to determine which lines are padded and discarded, and which lines are data to be displayed,
wherein the SoC is configured to transmit data to the serializer via spreading the data by skipping lines.

17. The system of claim 16, wherein the line mark memory is a repetitive pattern.

18. The system of claim 16, wherein, the line mark memory is a look-up table.

19. The system of claim 7, wherein a Gigabit Multimedia Serial Link (GMSL) serializer coupled to GMSL deserializers support daisy-chain multiple camera modules.

20. The system of claim 16, further comprising a plurality of deserializers, wherein Gigabit Multimedia Serial Link (GMSL) serializers coupled to GMSL deserializers support daisy-chain multiple camera modules.

* * * * *